UNITED STATES PATENT OFFICE.

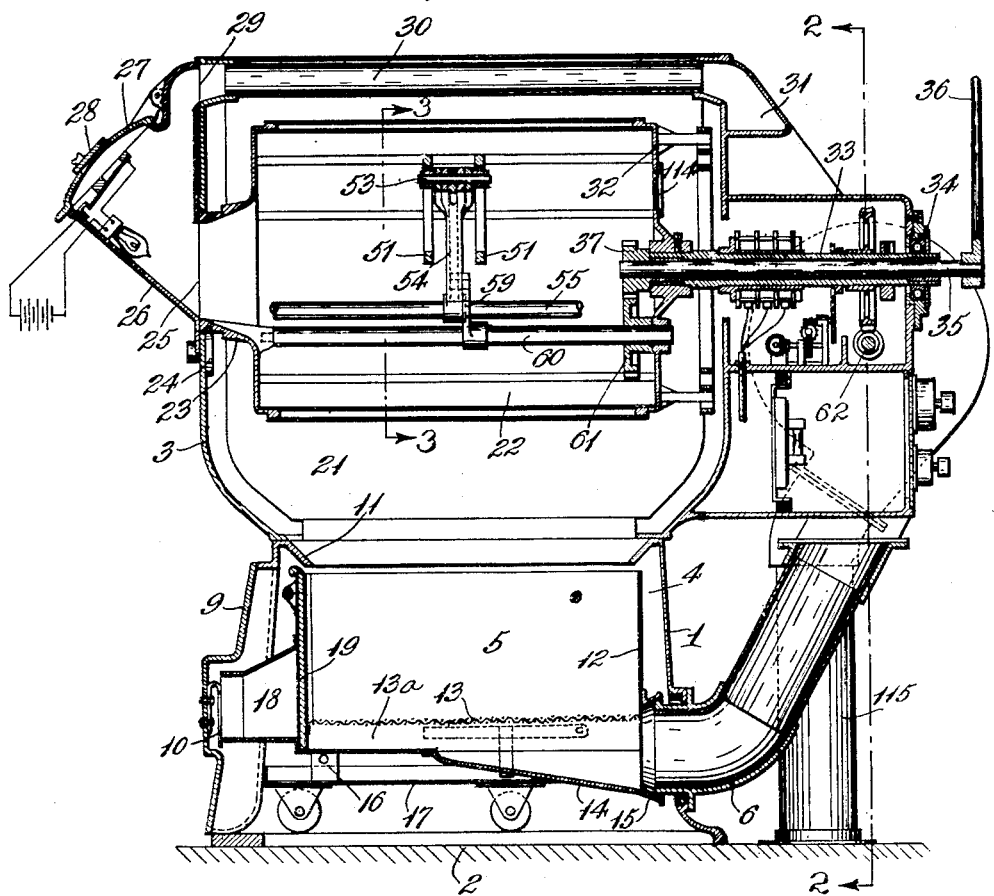

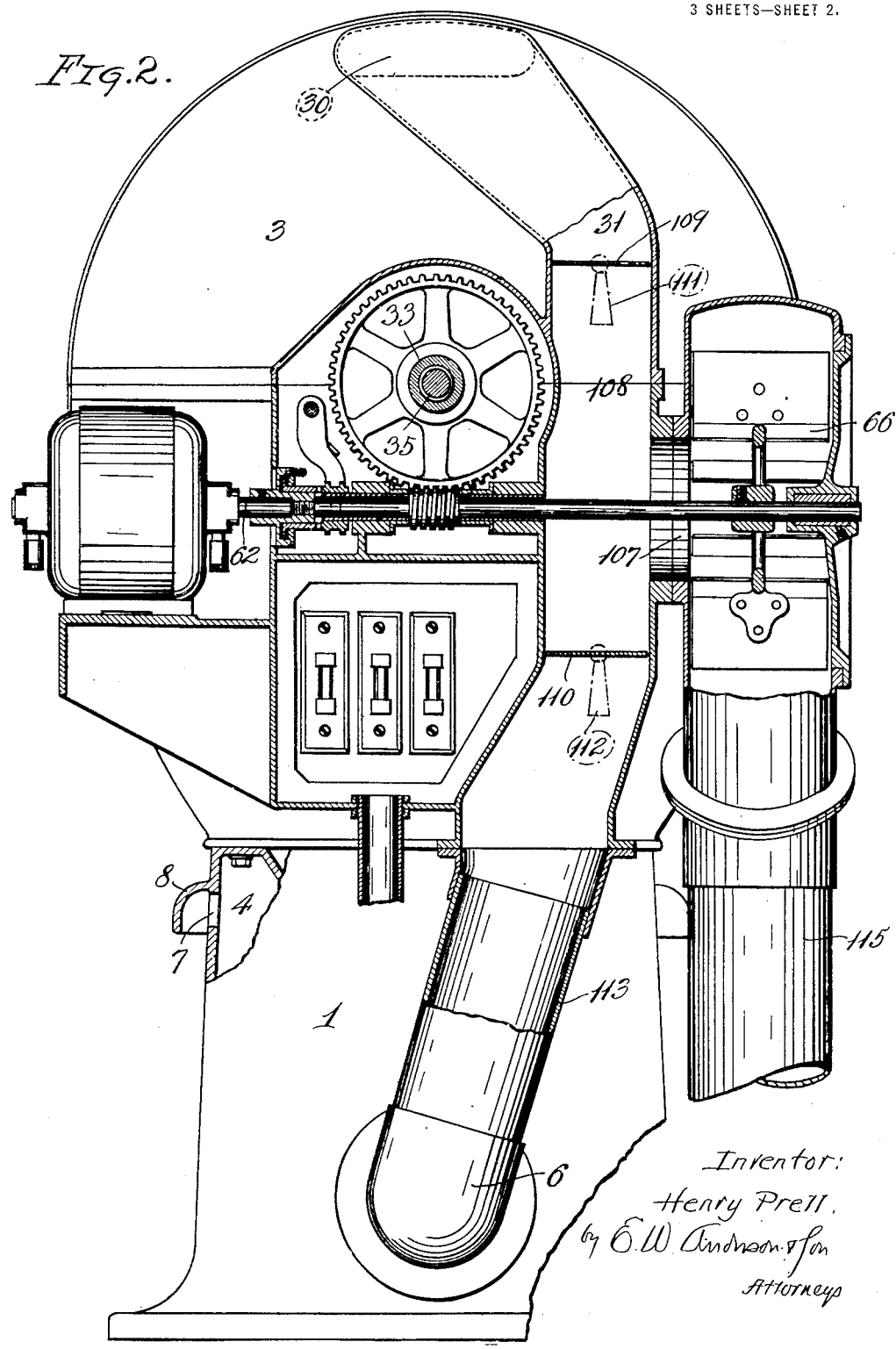

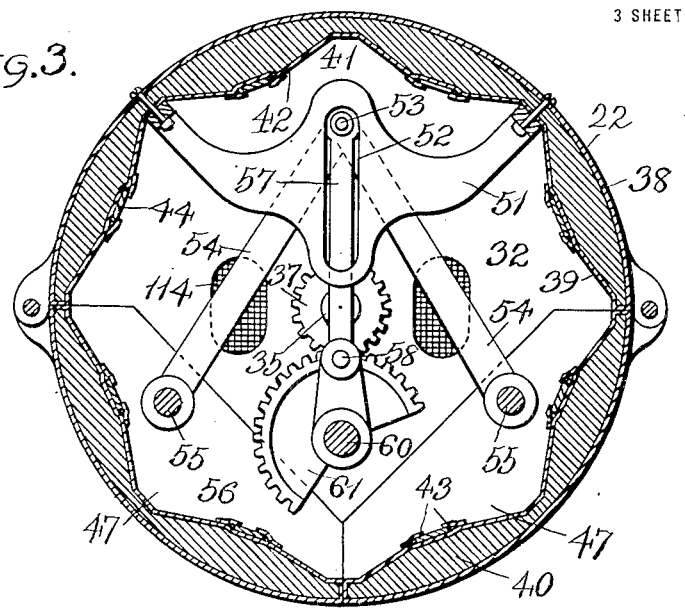
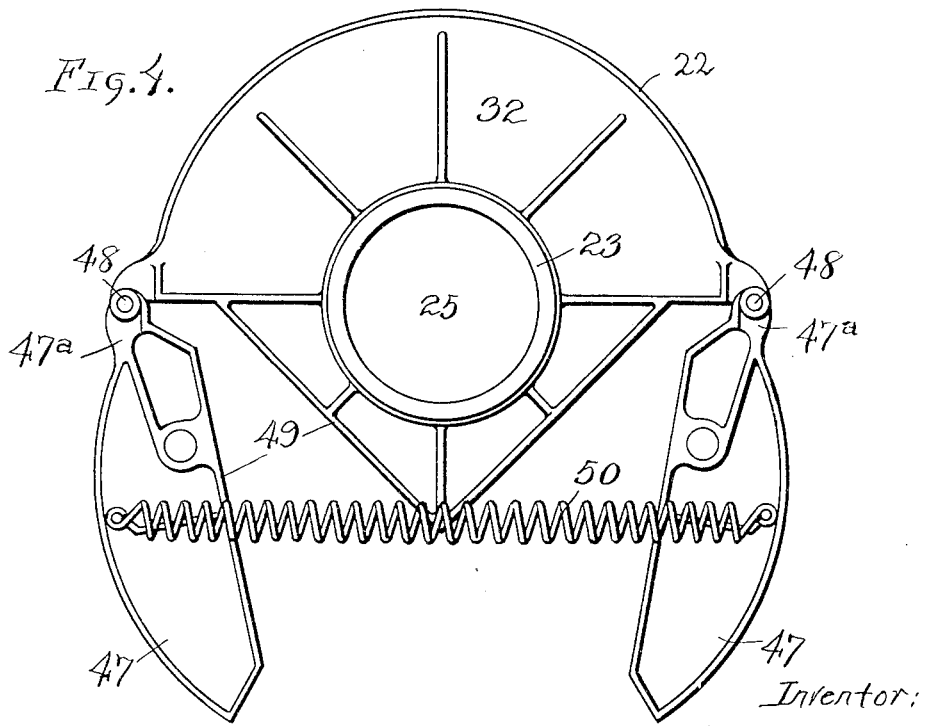

HENRY PRELL, OF CLEVELAND, OHIO, ASSIGNOR TO FREDERICK J. KUHLEMEIER, OF BURLINGTON, IOWA.

PROCESS OF ROASTING COFFEE.

1,398,115.  Specification of Letters Patent.  Patented Nov. 22, 1921.

Application filed July 16, 1919. Serial No. 311,313. Renewed May 12, 1921. Serial No. 468,979.

*To all whom it may concern:*

Be it known that I, HENRY PRELL, a citizen of the United States, resident of Cleveland, in the county of Cuyahoga and State of Ohio, have made a certain new and useful Invention in Process of Roasting Coffee; and I declare the following to be a full, clear, and exact description of the same, such as will enable others skilled in the art to which it appertains to make and use the invention, reference being had to the accompanying drawings, and to letters or figures of reference marked thereon, which form a part of this specification.

Figure 1 is a central longitudinal section of the invention.

Fig. 2 is a section on the line 2—2, Fig. 1.

Fig. 3 is a detail section on the line 3—3, Fig. 1.

Fig. 4 is a detail end view of the rotary drum, showing the doors open.

The invention has relation to a process for roasting coffee, having for its object to develop the greatest or maximum strength or degree of caffein constituent, and to develop the greatest or maximum aroma or degree of aromatic constituent or constituents.

The invention consists in the novel steps to be hereinafter described.

The green berries are first placed in a drum or container and an electric heating current turned on while the drum is rotated, a predetermined length of time, as 25 minutes, being sufficient to roast the berries to a very dark brown color or to obtain a "French" roast as distinguished from the "American" roast, which is much lighter in color.

During approximately the first three fifths of the time required for a complete roast, or fifteen minutes, there will be considerable vapor given off by the berries, said vapor being substantially all water, and having little or no caffein or aromatic constituents, and in order that the roasting shall be facilitated it is advisable to remove this water vapor or the major part thereof, as otherwise the time of roasting would be much increased, or a proper roasting be rendered difficult.

To this end therefore, preferably the damper 109 is slightly opened at the start of the roasting operation and the fan set in action to establish a slight circulation of air through the openings 7 of the casing, through the end openings 114 of the drum, and through the conduit 30 to the chimney or outer air.

During the balance or two fifths, or 10 minutes of time required for a complete roast, the damper 109 is closed, as there will be comparatively little water vapor given off by the berries, which will become drier and drier and will in roasting, which is necessarily a dry or comparatively dry process, give off more and more of their aromatic and caffein constituents, with which the air within the drum will become heavily charged or saturated. When this condition has been attained, the air in the drum is incapable of absorbing any further substantial portion of said constituents, which are thus caused to remain in the berries. The small hole or holes in the closed damper 109, with the fan in action, will also cause a slight circulation of air through the drum, and out through the conduit 30, and will in some cases at least, remove a sufficient portion of the water vapor to enable the roasting operation to be expeditiously performed, without permitting escape appreciably of the aromatic and caffein constituents of the coffee.

At the end of the time stated, or twenty five minutes, for a complete roast, or shortly therebefore, a timing device sounds an alarm, and the coffee is dumped as a whole or "*en masse*" quickly from the rotary drum into a dump car below, by opening the entire bottom of the drum consisting of hinged doors, in the manner of a dump cart.

At a moment just previous to the dumping of the roast, the fan or blower is set strongly in action and will create a strong draft of air downwardly through the mass of coffee in the dump car, and through the screen bottom of said car, this draft being adapted through its strength, volume and distribution to instantly check the roasting equally throughout the batch and to cool the hot berries in the quickest practicable time, the reason for the downward direction of the draft being that if it were upward, or in any direction without the interposition of a screen through which the coffee berries could not pass, the berries would be carried off bodily with the air current or draft, such is the strength of the latter.

It will be noted here that the draft of air last referred to enters from the openings 7 extending throughout the length of the dump car, and passes downwardly through the mass of coffee contained in said car from each side thereof and throughout the length of the mass, being thereby distributed and adapted to check the roasting equally throughout the batch or mass.

This strong draft of air is continued for four minutes approximately, when the coffee will be cooled equally throughout, as is made evident by passing the hand of the observer through any part of the mass. The cooling draft of air is, as stated, of such strength and volume, and so distributed, as to at once check the roasting of the coffee equally throughout all parts thereof, which would otherwise continue in the lower layers or intermediate layers, the desired roast obtained through inspection before dumping, being the roast that is delivered to the consumer.

The quick cooling of the coffee equally throughout the mass thereof, not only checks at once the roasting of the berries in all layers thereof, but has a further important advantage in contracting the hot berries quickly, to close their pores and thereby prevent the escape of the volatile caffein and aromatic constituents, which are the life of the coffee, and become lost to a considerable degree through protracted or delayed cooling.

The cooling of the coffee is accomplished within the inclosure or casing, enabling a strong concentrated cooling draft or current of air to be forced through the batch to cool the same equally throughout in the least practicable time.

A "French" roasted coffee is recognized as stronger or having a greater proportion of caffein, but is difficult to obtain, being now obtained imperfectly only through constant watchfulness, and, even with the greatest care, the lower or intermediate layers of coffee will become to some extent over-roasted or burned.

It is the object of this invention, therefore, to obtain a very dark brown or "French" roast with comparative ease, and to obtain a perfectly roasted batch, wherein all of the berries will be equally browned. Another object is to increase the strength of a coffee so roasted by retaining in the berries a substantial portion of the caffein and aromatic constituents during the roasting. Another object is to conserve the volatile caffein and aromatic constituents of the coffee by cooling the batch with sufficient rapidity to contract the hot berries quickly and thereby prevent the escape of said constituents.

The machine or means whereby this process is made possible will now be described, as follows:

The machine shown in the drawings forms the subject matter of my co-pending application for patent, Serial No. 231,234, and comprises a suitable outer frame or casing, which incloses the mechanism and confines the coffee being treated or cooled in a closed chamber. This casing includes a hollow base 1, resting upon the floor or other suitable solid support 2, and upon which is supported the large hollow drum ring-member or jacket 3. The hollow base 1 has an inner chamber 4 in which the coffee may be cooled, as will hereinafter appear, and serves to receive a suitable reservoir or container 5, into which the coffee is discharged after treatment by heat, as will appear. The front end of the base 1 is provided near its bottom with an opening to receive a bent pipe or conduit member 6 whose inner end projects into the chamber 4. Its side walls are provided, below the jacket 3, with horizontally extending slots or openings 7, protected from the entrance of dirt and dust by overhanging shields 8. The rear end of the base 1 is provided with a hinged door 9, preferably provided on its inner face with a fairly strong inwardly extending spring member 10.

The lower portions of the side and end walls of the jacket member 3 slope inwardly toward the center of the machine, and the upper portions of the walls of the base 1 also slope inwardly, as at 11, to thereby form a hopper bottom for the drum-holding portion of the casing. The outlet from the bottom of said hopper is directly over the reservoir or container 5, when the latter is in the base, as shown in Fig. 1. Consequently, coffee berries discharged from the drum into the hopper are directed into the container 5, and not wasted by scattering in the base of the machine. The container 5 is in the form of a drawer or box having an open top, imperforate side and end walls 12 and a false bottom 13 of fine wire mesh or other suitable perforated material. The perforations therein should be smaller than the smallest coffee berries, to avoid loss. Said container also has its bottom provided with a trough 14 whose depth increases gradually toward the front, where it is provided with an outwardly flaring circular mouth 15. When the container is pushed back into the base, as shown in Fig. 1, this mouth surrounds and closely hugs the inner projecting end of the conduit 6, the spring 10 serving to hold it in this position, as a consequence of which any suction or vacuum effect in the conduit is effective in the chamber 13$^a$, below the screen, and is distributed by the screen 13 over the entire area of coffee in the container, and hence the air current is drawn through the entire mass or "batch" of coffee, to cool the same.

The container 12 may itself be mounted upon suitable wheels, but is shown as provided with short lugs 16, resting upon a separate wheeled truck 17, upon which it may be moved from place to place. It may also be provided at one end with a suitable pouring spout 18, which may be closed by a suitable door, such as the slide 19.

The upper jacket portion 3 of the casing has an inner chamber 21, in which is located the hollow drum 22 in which the coffee is roasted. This drum may be of any suitable form, and is journaled in the casing for rotating movement on its own axis. For this purpose one end of the wall of the drum is provided with a hollow tubular portion 23, resting upon suitable anti-friction members, such as the rollers 24 journaled in the end wall of the casing 3. Said casing is provided with an opening 25, opposite said sleeve, surrounding which is a hopper member 26, attached to the casing and provided with a hinged door 27, by opening which the coffee berries may be poured directly into the drum, even while the latter is rotating. While the roasting is going on the door 27 may be opened for inspection of the coffee, or said door may also be provided with a small window or a smaller supplemental hinged door 28, to enable the coffee to be inspected without opening such a wide area.

The space within the hopper 26 communicates through an opening 29 with a conduit or passage 30, extending along the inner wall at the top of the casing to the front of the same, and which may be formed by a tubular member, held in flanges of the casing, as shown in Fig. 1, or in any other suitable manner. At the front of the casing, passage 30 communicates with passage 31, leading downwardly, and whose purpose will appear.

The opposite end wall 32 of the drum is attached to a tubular shaft or sleeve member 33, journaled in a suitable antifriction bearing 34, and within which is a rotatable shaft 35, provided with an operating handle 36 at its outer end and at its inner end, within the drum, with a gear 37.

The cylindrical portion of the drum may be formed in any suitable manner and preferably is made of sheet metal, having an outer cylindrical wall 38 and an inner wall 39, the space between said two walls being filled with suitable heat-insulating material 40, which confines the heat and directs it inwardly upon the material being treated. The inner wall 39 is made of copper or other good conductor of heat, to more quickly distribute the heat from the heating elements throughout the drum, and is also preferably insulated, with asbestos or other similar material, from the end drum heads and outer drum wall. Said inner wall is preferably corrugated or bent inwardly at intervals, to form shallow channels 41, separated by intervening shallow ridges 42, the interrupted surfaces thereby formed serving when the drum rotates to thoroughly agitate the material being treated. Each inwardly extending projection or ridge 42 is provided with a pair of parallel strips or flanges 43, forming a seat to confine a wide, thin, longitudinally extending electric heating element 44, whose inner surface is thereby exposed directly to the material in the drum.

The drum 22 is also so formed as to enable the contents thereof to be readily and quickly dumped, when desired, through the hopper 11 into the container 5. For this purpose the drum has its cylindrical body portion divided to form a movable door or doors each of 90° measurement and together controlling the entire bottom of the drum or oven. As illustrated there are two such doors 47, having ears 47$^a$ pivoted to the body portion of the drum on the longitudinally extending axes 48, the end drum walls being divided along the lines 49. At each end of the drum the two doors are connected by tension springs 50, tending to maintain them in closed position, to thereby prevent escape of material. Any suitable operating mechanism may be provided for opening said drum, preferably some mechanism capable of operation from the outside of the casing without opening the same. For this purpose the large body portion of the drum is provided with a pair of brackets 51, each provided with a radially extending slot 52 to receive a shaft or rod 53 connected by toggle links 54 to longitudinal rods 55 extending between the end wall portions 56 of the two door members. Shaft 53 is also connected by a link 57 to a crank pin 58 on an arm 59, carried by a shaft 60 on which is a gear segment 61, meshing with the gear 37 before referred to. Consequently, by turning the shaft 35 relative to the drum sleeve 33, the arm 59 will advance the shaft 53 toward the axis of the drum, thereby opening the toggle links 54 and moving the door portions 47 of the drum to the positions shown, thereby opening the entire bottom of the drum for a quick discharge. The drum is opened as described only when the doors are at the bottom of the drum, suitable devices being provided for insuring their operation only when in this position, one means for this purpose being described in my co-pending application Serial No. 231,234, hereinbefore referred to. When said doors are opened all of the material in the drum is discharged directly into the container 5.

The machine may be driven by any suitable source of power. 62 represents the main driving shaft of the machine, which, for example, may be provided with the usual fast and loose belt pulleys. The drawings, however, show said shaft connected to a suitable electric motor. Said shaft at its opposite end carries a fan 66, whose purpose is to produce air flow through the casing in a manner to be described. The fan 66 runs continuously, or without stop. The drum, however, is rotated only from time to time, as may be necessary, and at intervals is stopped for discharge of the load. Therefore, suitable clutch devices are interposed between the motor and the drum.

The axial inlet to the fan, indicated at 107, communicates with a vertically extending passage 108, provided above and below said inlet with suitable regulating valves, such as the rotatable dampers 109, 110, having operating handles 111, 112, located on the outside of the casing. Passage 108, above the damper 109, communicates with the passage 31 before referred to, and below the damper 110 communicates by way of a pipe 113 with the pipe or conduit 6. The drum 22, at its front end, is provided with one or several air openings 114, preferably screened to prevent loss of material. The outlet from the fan communicates with a conduit 115, preferably leading downwardly at the front of the machine, and which may either discharge into the open atmosphere or may lead through the floor to the outside of the building or to any other suitable point. The air inlet to the casing is always by way of the slots 7.

The apparatus is also arranged to conserve both heat and current. The double-walled drum, with its lining 40 of heat-insulated material, said lining being thickest directly opposite the several heating elements 44, conserves practically all of the heat and directs the same inwardly upon the material in the drum.

The machine shown and described is designed for use in dehydrating or for roasting various foods or substances, and in roasting coffee the damper 110 need not be used.

I claim:—

1. The process of roasting coffee, which consists in heating and agitating the berries in an inclosed chamber and establishing a slight circulation of air to remove from said chamber the major part of the moisture given off by the berries and thereafter browning the berries equally throughout the batch or mass thereof while confining the aromatic and caffein constituents of the berries within said chamber, so that the atmosphere therein becomes saturated with such constituents and will not absorb the remaining portion of them which are thus caused to remain in the berries.

2. The process of roasting coffee, which consists in first heating and agitating the berries in an inclosed chamber and establishing a slight circulation of air to remove from said chamber the major part of the moisture given off by the berries and thereafter browning the berries equally through the batch or mass thereof while confining the aromatic and caffein constituents of the berries within said chamber, so that the atmosphere therein becomes saturated with such constituents and will not absorb the remaining portion of them which are thus caused to remain in the berries, and secondly, dumping the batch as a whole instantly from said chamber to a cooling receptacle, and thirdly checking instantly the roasting equally throughout the batch to contract the hot berries quickly to conserve the volatile caffein and aromatic constituents.

3. The process of roasting coffee, which consists in first heating and agitating the berries in an inclosed chamber and establishing a slight circulation of air to remove from said chamber the major part of the moisture given off by the berries and thereafter browning the berries equally through the batch to a "French" roast or to a point where further browning would be prejudicial while confining the aromatic and caffein constituents of the berries within said chamber, so that the atmosphere therein becomes saturated with such constituents and will not absorb the remaining portion of them which are thus caused to remain in the berries, and secondly, dumping the batch as a whole instantly from said chamber to a cooling receptacle, and thirdly, instantly checking the roasting equally throughout the batch to contract the hot berries quickly to conserve the volatile caffein and aromatic constituents.

4. The process of roasting coffee, which consists first in heating and agitating the berries in an inclosed chamber and establishing a slight circulation of air to remove from said chamber the major part of the moisture given off by the berries and thereafter browning the berries equally throughout the batch while confining the aromatic and caffein constituents of the berries within said chamber, so that the atmosphere therein becomes saturated with such constituents and will not absorb the remaining portion of them which are thus caused to remain in the berries, and secondly, dumping the batch as a whole instantly from said chamber to a cooling receptacle, and thirdly instantly checking the roasting equally throughout the batch to contract the hot berries quickly to conserve the volatile caffein and aromatic constituents thereof by subjecting the batch as a whole simultaneously with the dumping thereof to the action of a powerful cooling draft distributed throughout the batch and acting in the direction of and adapted to assist the said dumping.

5. The process of roasting coffee, which consists first in heating and agitating the berries in an inclosed chamber and establishing a slight circulation of air to remove from said chamber the major part of the moisture given off by the berries and thereafter browning the berries equally throughout the batch to a "French" roast or to a point where further browning would be prejudicial while confining the aromatic and caffein constituents of the berries within said chamber, so that the atmosphere therein becomes saturated with such constituents and will not absorb the remaining portion of them which are thus caused to remain in the berries, and secondly, dumping the batch as a whole instantly from said chamber to a cooling receptacle, and thirdly, instantly checking the roasting equally throughout the batch to contract the hot berries quickly to conserve the volatile caffein and aromatic constituents thereof by subjecting the batch as a whole simultaneously with the dumping thereof to the action of a powerful cooling draft distributed throughout the batch and acting in the direction of and adapted to assist the said dumping.

In testimony whereof I affix my signature in presence of two witnesses.

HENRY PRELL.

Witnesses:
L. J. PETRE,
C. H. MORROW.